(12) United States Patent
Skoog et al.

(10) Patent No.: US 6,210,791 B1
(45) Date of Patent: Apr. 3, 2001

(54) ARTICLE WITH A DIFFUSE REFLECTIVE BARRIER COATING AND A LOW-EMISSITY COATING THEREON, AND ITS PREPARATION

(75) Inventors: Andrew J. Skoog, West Chester; Jane A. Murphy, Middletown, both of OH (US); William R. Stowell, Rising Sun, IN (US)

(73) Assignee: General Electric Company, Cincinnatti, OH (US)

( * ) Notice: Subject to any disclaimer, the term of this patent is extended or adjusted under 35 U.S.C. 154(b) by 0 days.

(21) Appl. No.: 09/334,579

(22) Filed: Jun. 16, 1999

Related U.S. Application Data (63) Continuation-in-part of application No. 08/564,859, filed on Nov. 30, 1995, now abandoned.

(51) Int. Cl.$^7$ ..................................................... B32B 17/00
(52) U.S. Cl. .......................... 428/325; 428/469; 428/472; 428/447; 428/448; 428/450; 428/701; 428/702; 106/286.5; 106/287.1; 106/287.12; 106/287.17; 427/427; 427/376.1; 427/376.6; 427/419.2
(58) Field of Search .................................... 428/325, 469, 428/472, 447, 448, 450, 701, 702; 106/286.5, 287.1, 287.12, 287.17; 427/376.1, 376.6, 419.2, 427

(56) References Cited

U.S. PATENT DOCUMENTS

| | | | |
|---|---|---|---|
| 3,794,511 | 2/1974 | Baranow | 117/22 |
| 3,955,935 | 5/1976 | Shockley et al. | 29/194 |
| 4,034,142 | 7/1977 | Hecht | 428/678 |
| 4,071,372 | 1/1978 | Bird | 106/73.5 |
| 4,142,023 | 2/1979 | Bomstein et al. | 428/680 |
| 4,313,760 | 2/1982 | Dardi et al. | 106/1.12 |
| 4,339,509 | 7/1982 | Dardi et al. | 428/632 |
| 4,346,137 | 8/1982 | Hecht | 428/215 |
| 4,447,503 | 5/1984 | Dardi et al. | 428/632 |
| 4,615,864 | 10/1986 | Dardi et al. | 420/437 |
| 5,057,196 | 10/1991 | Creech et al. | 204/181.5 |
| 5,078,837 | 1/1992 | Descamp et al. | 205/181 |
| 5,079,100 | 1/1992 | Descamp et al. | 428/552 |
| 5,104,293 | 4/1992 | Eaton, Jr. et al. | 416/241 B |
| 5,113,582 | 5/1992 | Monson et al. | 29/889.2 |
| 5,124,006 | 6/1992 | Fayeulle et al. | 205/195 |
| 5,180,285 | 1/1993 | Lau | 416/241 B |
| 5,210,944 | 5/1993 | Monson et al. | 29/889.2 |
| 5,220,786 | 6/1993 | Campbell | 60/39.32 |
| 5,224,822 | 7/1993 | Lenahan et al. | 415/189 |
| 5,236,151 | 8/1993 | Hagle et al. | 244/117 A |
| 5,236,745 | 8/1993 | Gupta et al. | 427/454 |
| 5,238,752 | 8/1993 | Duderstadt et al. | 428/623 |
| 5,254,413 | 10/1993 | Maricocchi | 428/633 |
| 5,262,245 | 11/1993 | Ulion et al. | 428/678 |
| 5,268,238 | 12/1993 | Czech et al. | 428/678 |
| 5,281,487 | 1/1994 | Rumaner et al. | 428/552 |
| 5,297,765 | 3/1994 | Hughes et al. | 244/209 |
| 5,304,031 | 4/1994 | Bose | 415/173.4 |
| 5,312,788 | 5/1994 | Li et al. | 501/97 |
| 5,316,866 | 5/1994 | Goldman et al. | 428/621 |
| 5,324,544 | 6/1994 | Spence et al. | 427/397.7 |
| 5,851,679 | 12/1998 | Stowell et al. | 428/472 |

*Primary Examiner*—Timothy M. Speer
(74) *Attorney, Agent, or Firm*—Andrew C. Hess; David L. Narciso (57) ABSTRACT

A coated article suitable for use at elevated temperature is formed of a substrate made from metal or a ceramic, a diffuse reflective barrier coating overlying the substrate, and a low-emissivity top coat covering the diffuse reflective barrier coating. The diffuse reflective barrier coating includes a transmissive medium having a transmissive-medium index of refraction, and a plurality of radiation-scattering centers distributed in the transmissive medium, the radiation-scattering centers having a scattering-center index of refraction different from the transmissive-medium index of refraction. The radiation scattering centers may be voids or second ceramic particles. The diffuse reflective barrier coating has a surface roughness of less than about 150 microinches RMS.

20 Claims, 4 Drawing Sheets

ARTICLE WITH A DIFFUSE REFLECTIVE BARRIER COATING AND A LOW-EMISSITY COATING THEREON, AND ITS PREPARATION

This application is a continuation-in-part of application Ser. No. 08/564,859 now abandoned, filed Nov. 30, 1995, for which priority is claimed and whose disclosure is incorporated by reference.

FIELD OF THE INVENTION

This invention relates to coatings for metal or ceramic substrates, and more particularly relates to coatings for metal or ceramic articles for use at elevated temperatures.

BACKGROUND OF THE INVENTION

In some applications, a structural part is exposed to high surface temperatures on a heated surface of the part. An oppositely disposed cooled surface of the part is cooled with a flow of cooling air. The maximum temperature reached by the part is determined by a balance between the amount of heat that enters the part from the heated surface, and the amount of heat removed by the cooling air flow over the cooled surface. Examples of such applications include combustors, nozzles, liners, and turbines in aircraft gas turbine engines.

It has been known to apply a thermal barrier coating system to the heated surface of the part to serve as an insulation that reduces the heat flow into the part and allows it to operate in a hotter external environment. The thermal barrier coating system typically includes a metallic bond coat overlying the metal or ceramic substrate that forms the part, and a ceramic layer overlying the bond coat. The bond coat improves the adherence of the ceramic layer to the substrate. The ceramic layer, which is typically a zirconium-based ceramic, reduces the heat flow into the substrate from the hot surface.

Coated articles having a metal or ceramic substrate, an intermediate thermal barrier coating overlying the substrate, and a low-emissivity metallic top coat over the thermal barrier coating are known. The available thermal barrier coatings typically utilize a ceramic layer overlying a metallic bond coat. The ceramic layer insulates the substrate, and the metallic bond coat improves the adherence of the ceramic layer to the substrate. The low-emissivity top coat reflects some of the thermal energy incident upon the coated article, so that the metal or ceramic part below is exposed to less heat input. While operable, the available systems with metallic top coats have not been practical for use in high-temperature environments such as gas turbines, because the reflective metal degrades and/or volatilizes after only a few minutes of exposure to the high-temperature, corrosive environment.

U.S. Pat. No. 5,851,679 discloses the use of a low-emissivity coating in the form of a ceramic multilayer optical reflector overlying the thermal barrier coating, to further reduce the heat flow into the coated part. This type of low-emissivity top coating is an improvement over metallic low-emissivity coatings, because it is more stable in the gas turbine environment.

However, the inventors have recognized that the available thermal barrier coatings have shortcomings in respect to their performance in conjunction with the ceramic multilayer or metallic low-emissivity top coats. Consequently, there is a need for a thermal barrier coating system which promotes the formation and functioning of low-emissivity top coats. The present invention fulfills this need, and further provides related advantages.

SUMMARY OF THE INVENTION

The present invention provides an article having a substrate optionally coated with a thermal barrier coating system, a diffuse reflective barrier coating overlying the substrate or, where present, the thermal barrier coating system, and a low-emissivity top coating overlying the diffuse reflective barrier coating. The diffuse reflective barrier coating and the low-emissivity, heat rejecting top coating cooperate to reduce heat flow into the article from a heating source on the same side of the article as the low-emissivity top coating. This combination achieves improved performance as compared with the article having a thermal barrier coating system alone, or the thermal barrier coating system and the low-emissivity top coating, but without any diffuse reflective barrier coating present.

A coated article suitable for use at elevated temperature comprises a metal or ceramic substrate, a diffuse reflective barrier coating overlying the substrate, and a low-emissivity top coat covering the diffuse reflective barrier coating. The diffuse reflective barrier coating comprises a transmissive medium having a transmissive-medium index of refraction, and a plurality of radiation-scattering centers distributed in the transmissive medium. The radiation-scattering centers have a scattering-center index of refraction different from the transmissive-medium index of refraction. The indices of refraction are preferably those measured for radiation in the range of from about 0.8 to about 5 micrometers wavelength. The diffuse reflective barrier coating desirably has a surface roughness of less than about 150 microinches RMS.

The transmissive medium may be a first plurality of first ceramic particles bonded together with a binder. Such first ceramic particles may have a single size range. Preferably, however, they are of two distinct size distributions, with a second set of the ceramic particles having a second size range different from a first size range of a first set of ceramic particles. The average of the second size range is preferably much smaller than the average of the first size range, with the average of the second size range most preferably being $\frac{1}{7}$ or less of the average of the first size range. The two sets of ceramic particles produce the desired smooth surface of the diffuse reflective barrier layer, with the smaller particles filling the spaces between the larger particles. The two sets of ceramic particles also produce a controllable array of voids within the transmissive medium. The radiation-scattering centers may be, for example, such an array of voids or an array of second ceramic particles dispersed through the transmissive medium, each of which has an index of refraction different from that of the transmissive medium.

In one embodiment, the diffuse reflective barrier coating is prepared from a diffuse reflective barrier coating composition comprising first ceramic particles having a number average diameter between 3.0 and 6.0 micrometers, second ceramic particles having a number average diameter of between 0.05 and 0.8 micrometers, a binder precursor, and a carrier liquid. The first ceramic particles and the second ceramic particles are preferably aluminum oxide, the binder precursor is preferably a silicone, and the carrier liquid is preferably an anhydrous alcohol.

The diffuse reflective barrier coating composition is applied to a metal substrate which has a thermal barrier coating and a bond coat already applied thereto. The thermal barrier coating may serve as the diffuse reflective barrier coating, if the thermal barrier coating is prepared according to the requirements set forth herein for the diffuse reflective barrier coating. The diffuse reflective barrier coating composition may also be applied to a ceramic substrate. In any event, the diffuse reflective barrier coating composition is applied overlying (but not necessarily contacting) the substrate, preferably by wet spray, is dried, and is thereafter fired to produce the desired diffuse reflective barrier coating. A low-emissivity top coating composition is applied over the diffuse reflective barrier coating to produce the desired coated articles.

The resulting article has a metallic substrate (optionally with a thermal barrier coating thereon) or a ceramic substrate, a diffuse reflective barrier coating comprising the transmissive medium formed of the first ceramic particles bonded together by the binder, and the scattering medium, and a low-emissivity coating layer overlying the diffuse reflective barrier coating. As noted, the ceramic thermal barrier coating may serve as the diffuse reflective barrier coating if it is structured as set forth herein. The diffuse reflective barrier coating has a surface roughness of less than about 150 microinches RMS.

The diffuse reflective barrier coating of the invention cooperates with the low-emissivity top coating to improve the heat-reflectance characteristics of the coated article in at least two ways. First, the diffuse reflective barrier coating provides a smooth surface upon which the low-emissivity top coating is applied. The surfaces of conventional ceramic substrates and thermal barrier coating systems used on metallic substrates are relatively rough, having a surface roughness of at least about 260 microinches RMS. The surface roughness of the diffuse reflective barrier coating of the invention is less than about 150 microinches RMS, thus providing a smooth base for the low-emissivity top coating. Such a smooth base is important, because the large surface roughness of the conventional ceramic substrates can produce multiple reflections that serve to absorb energy at the rough surface and thence into the substrate. This smooth surface of the diffuse reflective barrier coating is preferably achieved through the use of two different size distributions of ceramic particles, with the smaller particles filling the interstices between the larger particles and evening out the roughness that would otherwise be present in the surface of the ceramic layer.

Second, the available ceramic coating materials used in thermal barrier coatings and many ceramic substrate materials are semi-transparent to radiation in the wavelength range of about 1–12 micrometers. For example, the 0.009–0.012 inch thick zirconia-based ceramic layer used in many thermal barrier coating systems has approximately 40 percent transmittance of energy in the range of from about 0.8 micrometer to about 5 micrometer wavelength. This energy is transmitted to the substrate, increasing the heat input loading of the substrate. The diffuse reflective barrier coating of the invention serves to reduce the transmission of heat through the coating, so that it does not reach the substrate, by having a reflectivity governed by principles similar to those of Mie scattering. The result is less radiant heat transmission than permitted by conventional ceramic coatings.

The use of the diffuse reflective barrier coating achieves scattering of incoming heat energy governed by the principles similar to those of Mie scattering. The presence of the radiation-scattering centers and the associated Mie-type scattering in the diffuse reflective barrier coating, in combination with the reflectance of the overlying low-emissivity top coating, achieves an improvement in the reflectance of the coating from about 0.7 to about 0.9 in selected portions of the infrared, more specifically portions of the range of from about 0.8 micrometers to about 5 micrometers wavelength. Additionally, the complexity of the low-emissivity top coating may be reduced, in terms of the number of layers required, for a required reflectivity.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
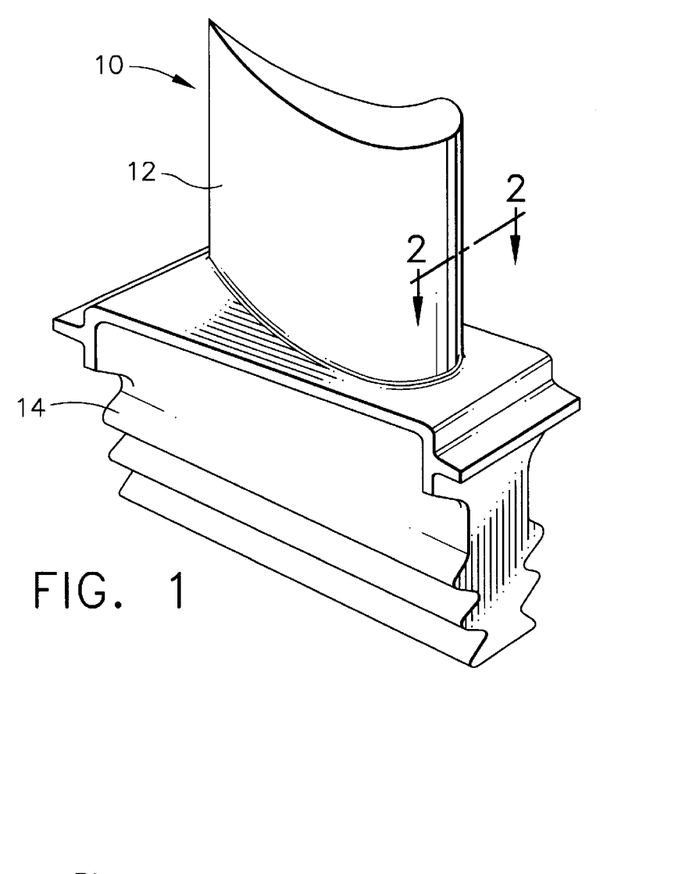
FIG. 1 is a perspective view of a turbine blade having a coating according to the present invention.

The diffuse reflective barrier coatings are suitable for use on any operable metal or ceramic substrate. The diffuse reflective barrier coating of the invention is preferably applied as an overlay coating to any of a variety of nickel-base or cobalt-base superalloy substrates, which may optionally have a ceramic thermal barrier coating already applied thereto. One such application is a coating on a jet engine gas turbine blade (component) 10 as illustrated in FIG. 1 or on an aircraft exhaust duct (not shown). The turbine blade 10 includes an airfoil 12 integral with a root 14, which attaches to a turbine wheel (not shown). Another such application is the combustor illustrated in FIG. 1 of U.S. Pat. No. 5,851,679, whose disclosure is incorporated by reference. The substrate may also be a ceramic material.

Figure 2:
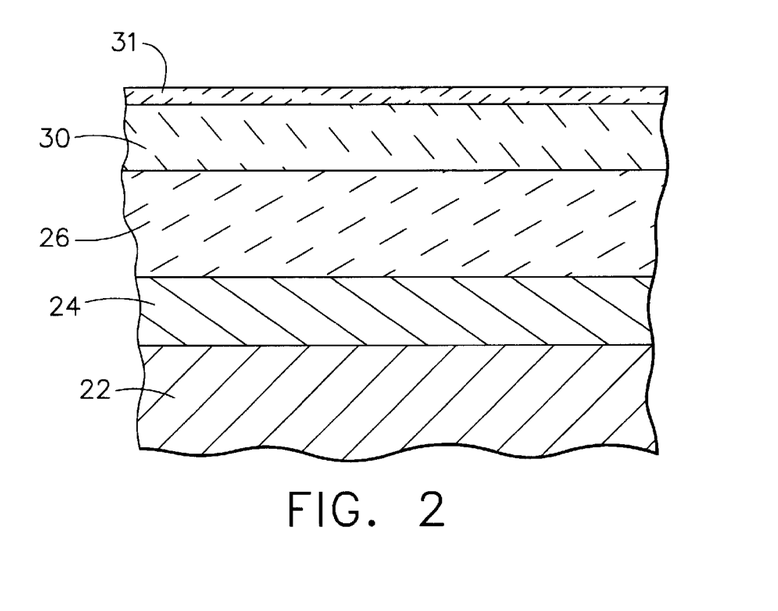
FIG. 2 is a sectional view of the blade of FIG. 1, taken along lines 2—2, having a bond coat, a thermal barrier coating, a diffuse reflective barrier coating, and a low-emissivity top coating.

FIG. 2 is a sectional view through the airfoil 12 portion of the turbine blade 10. The coated turbine blade 10 has a substrate 22, an optional thermal barrier coating 26 such as yttria-stabilized zirconia overlying the substrate 22, and a diffuse reflective barrier coating 30 and a low-emissivity top coating 31 overlying the substrate 22 and in this case the optional thermal barrier coating 26. Where a thermal barrier coating 26 is used, a bond coat 24 may be present between the substrate 22 and the thermal barrier coating 26. In the preferred structure illustrated in FIG. 2, the bond coat 24 overlies and contacts the substrate 22, the thermal barrier coating 26 overlies and contacts the bond coat 24, the diffuse reflective barrier coating 30 overlies and contacts the thermal barrier coating 26, and the low-emissivity top coating 31 overlies and contacts the diffuse reflective barrier coating 26.

FIG. 2 is not drawn to scale. In practice, the bond coat 24 is typically from about 0.001 to about 0.008 inch thick (in those cases where the bond coat is an overlay coating), the thermal barrier coating 26 is from about 0.002 inch to about 0.040 inch thick, the diffuse reflective barrier coating 30 is from about 0.0005 inch to about 0.007 inch thick, and the low-emissivity top coating 31 is from about 0.0004 inch to about 0.001 inch thick. The functions of the diffuse reflective barrier coating 30 and the thermal barrier coating 26 may be combined into a single layer which serves both functions, and in that case is termed the diffuse reflective barrier coating herein.

The substrate of the blade 10 may be formed of any suitable superalloy. One example of such a superalloy is Rene' 80, a well-known nickel-base superalloy which has a nominal composition, in weight percent, of 14 percent chromium, 9.5 percent cobalt, 5 percent titanium, 4 percent tungsten, 4 percent molybdenum, 3 percent aluminum, 0.17 percent carbon, 0.06 percent zirconium, 0.015 percent boron, and the balance nickel and incidental impurities. Another example is a more advanced nickel-base superalloy such as Rene' N4, having a composition, in weight percent, of 7.5 cobalt, 9.0 percent chromium, 3.7 percent aluminum, 4.2 percent titanium, 1.5 percent molybdenum, 4.0 percent tantalum, 6.0 percent tungsten, 0.5 percent columbium, and balance nickel and incidental impurities. These substrate superalloys are presented as examples, and the coatings are not limited for use with these substrates.

Suitable nickel-base superalloys typically contain, by weight percent, 10 to 80 percent nickel, 5 to 22 percent chromium, and may contain up to 10 percent molybdenum, up to 5.5 percent titanium, up to 6.5 percent aluminum, up to 3 percent columbium, up to 9 percent tantalum, up to 15 percent tungsten, up to 2 percent hafnium, up to 1 percent rhenium, up to 1.5 percent vanadium, up to 40 percent cobalt, and up to 6 percent iron. The nickel-base alloys may also contain minor amounts of carbon, boron, zirconium, niobium, silicon, and manganese. They are also likely to contain small amounts of impurities of sulfur, copper, and phosphorus.

Suitable cobalt-base superalloys typically contain, by weight percent, 40 to 75 percent cobalt, 20 to 30 percent chromium, up to about 22 percent nickel, and up to 16 percent tungsten. They usually contain small amounts, less than 1 percent by weight, of carbon, manganese, and silicon. They often contain up to about 6 percent or 7 percent by weight total of one or more of titanium, boron, silicon, iron, tantalum, and columbium. They may also contain small amounts of impurities of sulfur, copper, or phosphorus.

Specific examples of suitable metallic substrates are set out in Shockley et al., U.S. Pat. No. 3,955,935, whose disclosure is incorporated herein by reference. Suitable alloys for exhaust ducts are available under the designations R41, HS188, Inco 625, and Inco 718. These alloys have nominal compositions, in weight percent, as follows: R41, 0.12 percent carbon, 0.1 percent manganese, 0.5 percent silicon, 19 percent chromium, 5 percent iron, 0.007 percent boron, 11 percent cobalt, 1.5 percent aluminum, 3.2 percent titanium, 9.8 percent molybdenum, balance nickel and impurities; HS188, 0.1 percent carbon, 1.25 percent manganese, 0.4 percent silicon, 22 percent chromium, 3.5 percent iron, 22 percent nickel, 15.5 percent tungsten, balance cobalt and impurities; Inco 625, 0.1 percent carbon, 0.5 percent manganese, 0.5 percent silicon, 21.5 percent chromium, 5 percent iron, 1 percent cobalt, 0.4 percent aluminum, 0.4 percent titanium, 9 percent molybdenum, 3.7 percent niobium plus tantalum, balance nickel and impurities; Inco 718, 0.05 percent carbon, 0.35 percent manganese, 0.35 percent silicon, 19.0 percent chromium, 0.006 percent boron, 52.5 percent nickel, 0.5 percent aluminum, 0.9 percent titanium, 3 percent molybdenum, 4.9 percent niobium plus tantalum balance iron and impurities.

The substrate may also be a ceramic material, such as a zirconia-base ceramic, an alumina-based ceramic, a magnesia-based ceramic, a ceramic composite such as alumina-silica (GE Gen 4), or a refractory material with, for example, silicon carbide, silicon nitride, alumina, silica, and/or calcia.

Figure 3:
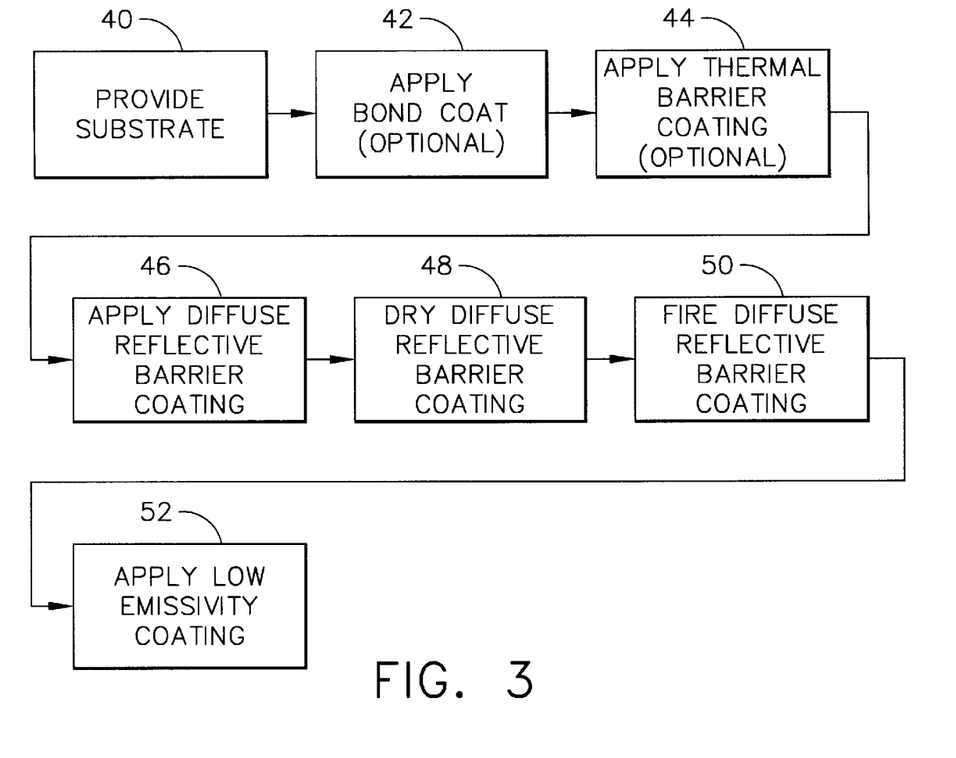
FIG. 3 is a block diagram of a preferred approach for preparing a coated article according to the invention.

As depicted in FIG. 3, a method for producing a coated article having the diffuse reflective barrier coating 30 includes the steps of providing the substrate 22 made from a metal or ceramic material, numeral 40. The substrate 22 may be any of the types of materials discussed above. The bond coat 24 may optionally be applied overlying and contacting a surface of the substrate 22, numeral 42, where the substrate is a metal. The bond coat 24 may be of any operable type, such as, for example, a platinum-aluminum diffusion aluminide coating or a NiCoCrAlY(X) overlay coating, where X may be hafnium, silicon, and/or tantalum. The platinum-aluminum diffusion aluminide coating is typically applied by depositing a sublayer of platinum by electrodeposition, vapor depositing an aluminum sublayer over the platinum, and interdiffusing the deposited layers with each other and into the substrate. In a preferred embodiment, the platinum is present in an average amount of from about 4 to about 15 atomic percent, preferably about 4 to about 13 atomic percent, of the protective layer 34, and the aluminum is present in an average amount of from about 30 to about 60 atomic percent, preferably about 30 to about 50 atomic percent, of the protective layer 34. The remainder of the platinum-aluminum diffusion aluminide is elements diffused therein from the substrate 22. The NiCoCrAlY(X) overlay coating is typically applied by low-pressure plasma spray (LPPS), air plasma spray (APS), high velocity oxy-flame deposition (HVOF), or electron beam physical vapor deposition (EB-PVD). The overlay coating preferably has a thickness of from 0.001 inch to 0.008 inch. The NiCoCrAlY (X) overlay coating may have a composition in weight percent, for example, of 20 percent cobalt, 18 percent chromium, 12 percent aluminum, 0.3 percent yttrium, 0.5 percent hafnium, 0.5 percent silicon, balance nickel.

The thermal barrier coating 26 may optionally be applied overlying the bond coat 24, numeral 44. The thermal barrier coating 26 is preferably yttria-(partially) stabilized zirconia, which is a zirconium oxide-base ceramic material containing from about 4 to about 8 weight percent of yttrium oxide. Other operable stabilizing oxides and ceramic base materials may be used as well. The thermal barrier coating preferably has a thickness of from 0.002 to 0.040 inch. The thermal barrier coating 26 may be deposited by any operable technique, with air plasma spraying (APS) being preferred for the preferred yttria-stabilized zirconia coating. The upper surface of the thermal barrier coating 26 may be surface finished, as by sanding, to reduce its roughness somewhat prior to subsequent deposition of the diffuse reflective barrier coating thereon.

The bond coat 24 is preferably used in conjunction with the thermal barrier coating 26, although in some cases the thermal barrier coating may not require a bond coat. The present invention may also be used with a bond coat 24 only and without the presence of the thermal barrier coating, so that the bond coat then serves as a environmental coating to protect the substrate. If the substrate is a ceramic, the bond coat 24 and the thermal barrier coating 26 are usually both omitted.

The method further includes applying a diffuse reflective barrier coating composition onto the substrate 22 or onto the bond coat 24 or the thermal barrier coating 26, where present, numeral 46, to provide a diffuse reflective barrier coating layer. The diffuse reflective barrier coating preferably has a thickness of about 0.0005 to about 0.007 inch. The application step 46 is preferably accomplished by spraying of a mixture of the particles, the binder, and the carrier liquid. The diffuse reflective barrier coating composition preferably comprises (i) first alumina particles having a number average diameter of between 3.0 and 6.0 micrometers, the first alumina particles being present at a level of from 10 to 60 percent by weight based on the total weight of the composition, (ii) second alumina particles having a number average diameter of between 0.05 and 0.8 micrometers, the second alumina particles being present at a level of from 5 to 50 percent by weight based on the total weight of the composition, (iii) a silicone, and (iv) a carrier liquid.

The diffuse reflective barrier coating composition preferably comprises (a) the first alumina particles at a level of from 5 to 85 percent by weight based on the total weight of the reflective barrier composition, more preferably 10 to 60 weight percent thereof, more preferably from 20 to 50 percent by weight thereof, and most preferably from 23 to 35 percent by weight thereof; (b) the second alumina particles at a level of from 5 to 85 percent by weight based on the total weight of the reflective barrier composition, more preferably from 10 to 50 weight percent thereof, more preferably from 15 to 40 percent by weight thereof, and most preferably from 20 to 30 percent by weight thereof; (c) the silicone binder at a level of from 1 to 55 percent by weight thereof, most preferably from 5 to 35 percent by weight based on the total weight of the reflective barrier composition, more preferably from 10 to 30 percent by weight thereof, and most preferably from 15 to 20 percent by weight thereof; and (d) the carrier liquid at a level of from 10 to 80 percent by weight based on the total weight of the reflective barrier composition, more preferably from 10 to 50 percent by weight thereof, and most preferably 20 to 30 percent by weight thereof.

The first and second alumina particles are preferably present at a combined level of at least 40 percent by weight based on the total weight of solids in the diffuse reflective barrier coating composition, more preferably from 60 to 90 percent by weight thereof, and most preferably from 70 to 80 percent by weight thereof, and the binder (silicone) is preferably present at a level of from 5 to 50 percent by weight based on the total weight of the solids in the diffuse reflective barrier coating composition, more preferably from 10 to 40 percent by weight thereof, and most preferably from 20 to 30 percent by weight thereof. The first alumina particles are preferably present at a level of from 10 to 90 percent by weight based on the total weight of alumina particles (combined weight of first and second alumina particles), more preferably from 40 to 70 percent by weight thereof, and most preferably from 50 to 60 percent by weight thereof; and the second alumina particles are preferably present at a level of 10 to 90 percent by weight based on the total weight based on the total weight of alumina particles (combined weight of first and second alumina particles), more preferably at a level of from 30 to 60 percent by weight thereof, and most preferably at a level of from 40 to 50 percent by weight thereof.

The first alumina particles preferably have a number average particle size (diameter) of between 3.0 and 6.0 micrometers, and more preferably between 3.0 and 5.5 micrometers. A suitable first alumina particles product is commercially available from ALCOA as designation A14, a calcined alumina having a low soda ($NaO_2$<0.10 percent) content having a crystal size of 3.0–5.5 micrometers. More specifically, A14 particles have the following weight percent components: 99.8 percent alumina, 0.03 percent $Na_2O$, 0.04 percent $SiO_2$, 0.02 percent $Fe_2O_3$, 0.04 percent $B_2O_3$, has a medium micron size (Sedigraph 5100) of 5.4, a surface area of 0.5 square meters per gram, a loss on ignition of 0.07 percent, a total water content of 0.09 percent, a loose bulk density of 72.0 pounds per cubic foot, a packed bulk density of 79.0 pounds per cubic foot, a specific gravity of 3.965, and an unground particle mesh size (cumulative) of 3 percent on 100 mesh, 56 percent on 200 mesh, 89 percent on 325 mesh, and 11 percent through 325 mesh.

The second alumina particles preferably have a number average particle size (diameter) of between 0.05 and 0.8 micrometers, more preferably between 0.10 and 0.6 micrometers, for example, having an average particle size of 0.15 micrometers. A suitable second alumina particle product is commercially available from Baikowski International Corporation under the trademark Baikalox SM8 having 99.99 percent $Al_2O_3$, by weight, a specific surface areas BET square meters per gram of 10+/−1, a major phase of alpha, 95 percent major phase, a crystal density of 3.98 grams per square centimeter, a bulk density of 0.93 grams per cubic centimeter, a pressed density of 1.85 grams per cubic centimeter at 2200 psi, and an agglomerate size distribution on a cumulative weight basis of 65 weight percent being <0.3 micrometer, 78 percent being <0.4 micrometer, 90 percent being <0.5 micrometers, 95 percent being <0.6 micrometers, and 100 percent being less than 1.0 micrometers, and having 8 ppm Na, 35 ppm K, 35 ppm Si, 6 ppm V and 3 ppm Ca.

Figure 4:
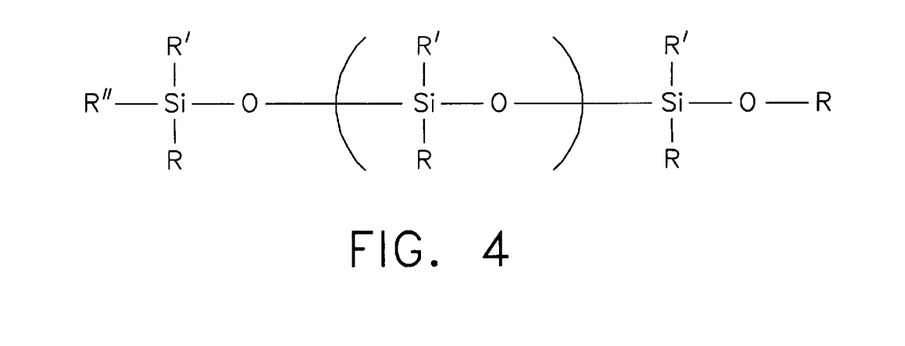
FIG. 4 is a representation of the chemical structure of a preferred silicone resin.

The binder is preferably a silicone binder, and is more preferably a polymethyl siloxane binder. A suitable binder resin is SR350 classified as a methylsesquisiloxane mixture of the polysiloxane family having a specific gravity of 1.05 to 1.10, a bulk density of 1.02 to 1.14 grams per cubic centimeter, a maximum gel percent of 0.3, and a melt viscosity of 400 to 2000 cps. The silicone resins may be represented by the formula set forth in FIG. 4, wherein R', R, and R" are preferably selected from alkyl groups having 1 to 14 carbon atoms, and are most preferably methyl groups, and n is preferably selected from 1–1000, for example from 1 to 500.

The carrier liquid is preferably an anhydrous alcohol such as methanol or ethanol, or may be acetone or trichloroethylene. It is present in an amount sufficient to reduce the viscosity of the mixture of the remaining materials to the proper consistency for application, such as by spraying.

The diffuse reflective barrier coating composition may also contain from about 1 to about 40 weight percent of other particles of different refractive indices, such as hafnium oxide, lanthanum oxide, cerium oxide, tantalum oxide, silica (fumed silica), zirconia, and/or magnesium oxide based on the total weight of solids in the composition, or it may be free of such particles.

The as-sprayed diffuse reflective barrier coating composition produced in step 46 is dried to produce a reflective dried coating layer, numeral 48, and fired to produce the diffuse reflective barrier coating, numeral 50. Drying 48 is preferably accomplished at room temperature for about 16 hours, and firing 50 is preferably accomplished by heating up to a maximum temperature of from about 800° F. to about 2500° F., preferably about 1650° F., at a heating rate of 10° F. per minute and holding at the maximum temperature for about 1 hour. The maximum heating temperature may be selected according to the properties of the substrate.

Lastly, a low-emissivity top coating composition is applied to the diffuse reflective barrier coating, numeral 52. The low-emissivity top coating 31 typically comprises layers of materials such as SiO, $SiO_2$, $TiO_2$, or tantalum oxide. The low-emissivity top coating preferably has a thickness of less than 0.002 inches, preferably less than 0.001 inch, and most preferably from about 0.0004 to about 0.0006 inch. The low-emissivity top coating is preferably a multi-layer dielectric stack optical filter made of oxides of not less than two materials with specific thicknesses which tune performance to specific frequencies. Such low-emissivity coatings are disclosed in U.S. Pat. No. 5,851,679, whose disclosure is incorporated by reference. Metallic low-emissivity coatings such as gold, platinum, or other reflective coatings may also be used, but are less stable at elevated temperatures and are therefore less desirable.

The resultant coated article depicted in FIG. 2 thus comprises the substrate 22 made from a metal or a ceramic, the optional bond coat 24 overlying and contacting the surface of the substrate 22, the optional thermal barrier coating 26 overlying and contacting the surface of the bond coat 24, and the diffuse reflective barrier coating 30 overlying and contacting the substrate 22 or the layer 24 or thermal barrier coating 26 where present. The diffuse reflective barrier coating 30 comprises at least 40 percent by weight alumina based on the total solids in the coating, the alumina comprising from 10 to 90 percent by weight first alumina particles having a number average diameter of between 3.0 and 6 micrometers, and 10 to 90 percent by weight second alumina particles having a number average diameter of between 0.05 and 0.8 micrometers. The balance of the diffuse reflective barrier coating 30 is silica, silicate, and possibly mullite binder, and voids. The low-emissivity top coating 31 overlies and contacts the diffuse reflective barrier coating 30.

Figure 6:
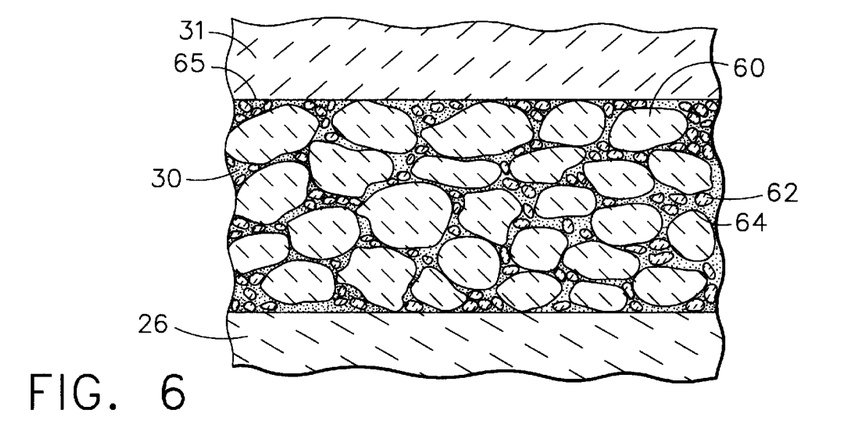
FIG. 6 is a schematic sectional view of a detail of FIG. 2, illustrating the structure of the diffuse reflective barrier coating.

FIG. 6 depicts in greater detail the structure of the diffuse reflective barrier coating 30. There are large ceramic particles 60 and small ceramic particles 62 bound together by a thin layer of the silica binder. This bonded structure serves as the transmissive medium for incident radiation, such as heat-transmitting radiation in the infrared range of from about 0.8 to about 5 micrometers wavelength. The bonded transmissive medium is not sintered to full density. Consequently, an array of a plurality of voids 64 remains in the spaces not filled by the large particles 60 and the small particles 62. The voids serve as radiation-scattering centers having an index of refraction different from that of the transmissive medium.

Portions of the radiation propagated in the transmissive medium are forward scattered and back scattered by the scattering centers. This forward scattering and back scattering of the radiation is similar in principle to Mie scattering, although Mie scattering is strictly applied only to specific types of scattering arrays. The scattering in the present case is therefore termed "Mie-like" scattering herein. According to Mie theory, the voids 64 are most effective in back-scattering (i.e., reflecting) the incident radiation when the voids have a diameter of about ¼ of the wavelength of the incident radiation. Where the radiation of interest to be reflected is in the 1–12 micrometer infrared range, the voids 64 should have diameters in the ¼–3 micrometer range. Where the radiation of interest to be reflected is in the 0.8–5 micrometer infrared range, the voids 64 should have diameters in the 0.2–1.25 micrometer range. It is not always possible to achieve exactly the desired range of void sizes in engineering practice, but the size distributions achieved by the use of two distributions of particle sizes, one much smaller than the other as set forth above, are reasonably close. If the average size of the second set of ceramic particles is less than about ⅕ of the average size of the first set of ceramic particles, then the desired distributions may be achieved. With a sufficient thickness of the diffuse reflective barrier layer, a high fraction of the incident infrared radiation is reflected.

The surface 65 of the diffuse reflective barrier layer 30 is quite smooth when made by this approach. The small ceramic particles 62 fill the spaces between the large ceramic particles 60 at the surface 65, in effect filling in the spaces and smoothing the surface. From FIG. 6, it may be seen that the surface 65 would be much rougher were the small ceramic particles 62 not present. That is the case for conventional coatings.

Figure 7:
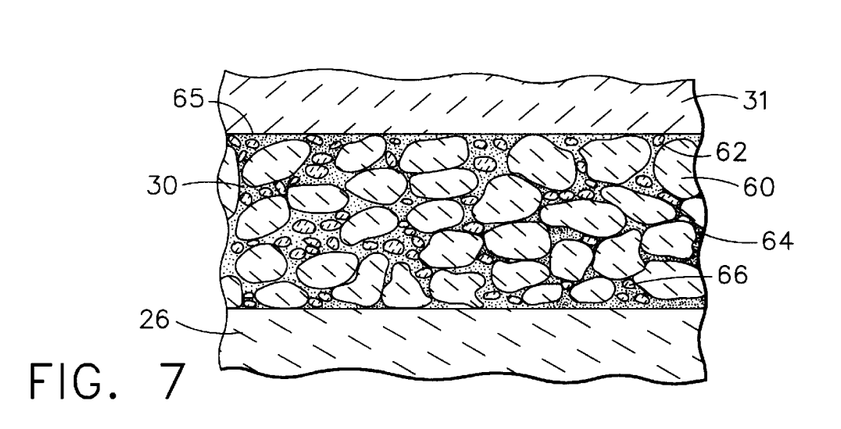
FIG. 7 is a schematic sectional view similar to FIG. 6, but illustrating a second embodiment of the diffuse reflective barrier coating.

The desired array of radiation-scattering centers may be achieved in the transmissive medium in other ways. As shown in FIG. 7, a second plurality of second ceramic particles 66 may be dispersed through transmissive medium and array of voids 64 as shown in FIG. 6 and described above. The resulting structure has large ceramic particles 60, small ceramic particles 62, voids 64, and second ceramic particles 66. The second ceramic particles 66 provide a second set of radiation-scattering centers, whose effects are additive with those of the first set of radiation-scattering centers (i.e., the voids 64) to back scatter another wavelength range. The second ceramic particles 66 must have a refractive index different from that of the particles 60 and 62. Where the particles 60 and 62 are aluminum oxide, the second ceramic particles 64 may be, for example, hafnium oxide, lanthanum oxide, cerium oxide, tantalum oxide, silica (fumed silica), zirconia, and/or magnesium oxide.

Figure 8:
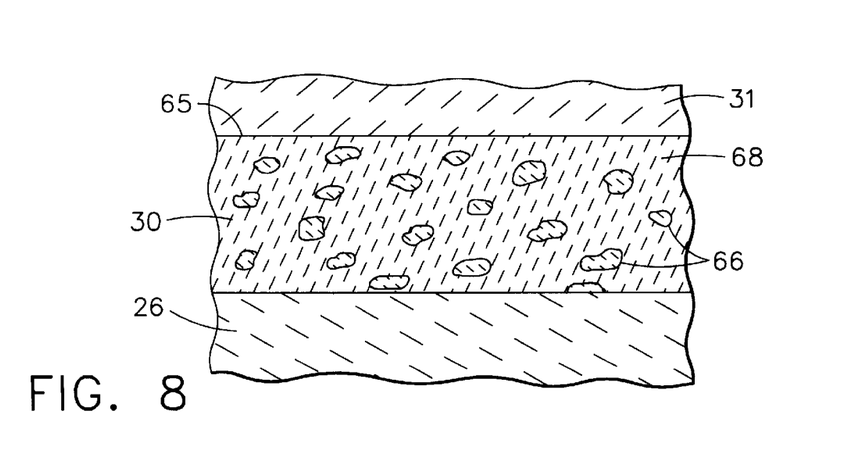
FIG. 8 is a schematic sectional view similar to FIG. 6, but illustrating a third embodiment of the diffuse reflective barrier coating.

In yet another embodiment shown in FIG. 8, the structure of FIG. 7 is sintered for a sufficiently long period of time that the voids 64 are reduced to zero size and disappear, producing a solid ceramic transmissive medium 68, which would be aluminum oxide in the case discussed earlier. The second ceramic particles 64 would remain, serving as the only radiation-scattering centers. In this case, the sizes of the second ceramic particles must be sufficiently small to interact with the radiation wavelength of interest as discussed earlier.

The following examples illustrate aspects of the invention, but should not be interpreted as limiting the invention in any respect.

A diffuse reflective barrier coating composition was prepared having 30.2 percent by weight of the first alumina particles ($Al_2O_3$, A-14) based on the total weight of the composition, the second alumina particles ($Al_2O_3$, SM8) at a level of 22.0 percent by weight thereof, the binder (silicone, SR350) at a level of 18.5 percent by weight thereof, and the liquid carrier reagent alcohol (anhydrous) at a level of 29.3 percent by weight thereof. The material was sprayed on a substrate to obtain a coating layer having a thickness of 0.002–0.005 inches, allowed to dry overnight, put through a firing cycle at 600° F. followed by ramping up to a temperature between 800° F. and 2500° F., typically about 1650° F., and cooled to room temperature.

Figure 5:
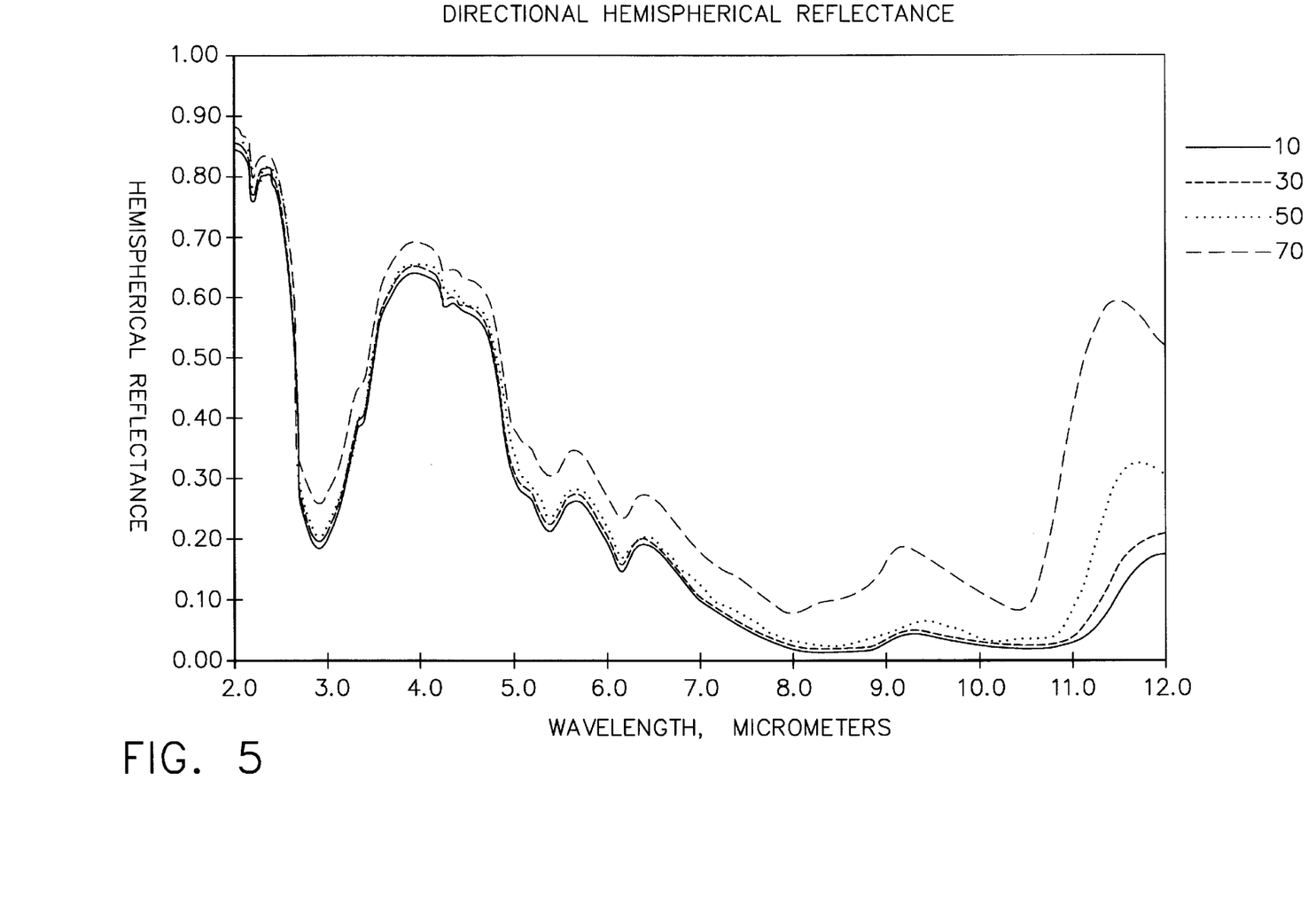
FIG. 5 is a graph of reflective performance of the diffuse reflective barrier coating as a function of wavelength of incident infrared energy.

The present invention has been reduced to practice with the preferred diffuse reflective barrier coating 30 of the invention. The substrate was zirconium oxide, and the diffuse reflective barrier coating had a thickness of from about 0.001 to about 0.006 inch. FIG. 5 illustrates the reflectance of the diffuse reflective barrier coating alone (with no low-emissivity top coating present) as a function of infrared wavelength of the incident energy and for different angles of incidence of the infrared energy. The diffuse reflective barrier coating exhibits Mie-like scattering. When the low-emissivity top coating is added, as provided in the present invention, synergistically improved thermal reflectivity is achieved.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A coated article suitable for use at elevated temperature which comprises:
   a substrate selected from the group consisting of metals and ceramics,
   a diffuse reflective barrier coating on the substrate, the diffuse reflective barrier coating comprising at least 40 percent by weight alumina based on the total solids in the coating, the alumina comprising from 10 to 90 percent by weight first alumina particles having a number average diameter of between 3.0 and 6.0 micrometers, and 10 to 90 percent by weight second alumina particles having a number average diameter of between 0.05 and 0.8 micrometers, and
   a low-emissivity coating on the diffuse reflective barrier coating, the low-emissivity coating comprising a metal oxide.

2. The article of claim 1, wherein the diffuse reflective barrier coating further comprises from 5 to 50 percent by weight of a silicone based on the total solids in the coating.

3. The article of claim 1, wherein the first particles are present at a level of from 60 to 90 percent by weight based on the total weight of solids in the coating.

4. The article of claim 1, wherein the first particles are present at a level of from 70 to 80 percent by weight based on the total weight of solids in the coating.

5. A coating composition for making diffuse reflective barrier coatings, the composition comprising:
   first alumina particles having a number average diameter of between 3.0 and 6.0 micrometers, the first alumina particles being present at a level of from 10 to 60 percent by weight based on the total weight of the composition,
   second alumina particles having a number average diameter of between 0.05 and 0.8 micrometers, the second alumina particles being present at a level of from 10 to 50 percent by weight based on the total weight of the composition,
   a silicone present at a level of from 5 to 35 percent by weight based on the total weight of the composition, and
   a carrier liquid present at a level of from 10 to 50 percent by weight based on the total weight of the composition.

6. The composition of claim 5, wherein the carrier liquid is an anhydrous alcohol.

7. The composition of claim 5, wherein the silicone is a polymethyl siloxane.

8. A method for producing a coated article having a diffuse reflective barrier coating, the method comprising:
   providing a substrate made from a material selected from a metal and a ceramic,
   spraying a diffuse reflective barrier coating composition onto the substrate to provide an as-sprayed diffuse reflective barrier coating layer having a thickness of from 0.0005 to 0.007 inch, the diffuse reflective barrier coating composition comprising,
      (i) first alumina particles having a number average diameter of between 3.0 and 6.0 micrometers, the first alumina particles being present at a level of from 10 to 60 percent by weight based on the total weight of the composition,
      (ii) second alumina particles having a number average diameter of between 0.05 and 0.8 micrometers, the second alumina particles being present at a level of 5 to 85 percent by weight based on the total weight of the composition,
      (iii) a silicone present at a level of from 1 to 55 percent by weight based on the total weight of the composition, and
      (iv) a carrier liquid present at a level of from 10 to 80 percent by weight based on the total weight of the composition,
   drying the as-sprayed diffuse reflective barrier layer coating to produce a dried coating layer,
   firing the dried coating layer to produce a diffuse reflective barrier coating, and
   applying a low-emissivity coating composition to the diffuse reflective thermal barrier coating.

9. The method of claim 8, wherein the carrier liquid is an anhydrous alcohol.

10. The method of claim 8, wherein the diffuse reflective barrier coating further comprises from 5 to 50 percent by weight of a silicone based on the total solids in the coating.

11. A coated article suitable for use at elevated temperature comprising:
   a substrate made from a material selected from the group consisting of a metal and a ceramic;
   a diffuse reflective barrier coating overlying the substrate, the diffuse reflective barrier coating comprising
      a transmissive medium having a transmissive-medium index of refraction, and
      a plurality of radiation-scattering centers distributed in the transmissive medium, the radiation-scattering centers having a scattering-center index of refraction different from the transmissive-medium index of refraction; and
   a low-emissivity top coat covering the diffuse reflective barrier coating.

12. The coated article of claim 11, wherein the diffuse reflective barrier coating has a surface roughness of less than about 150 microinches RMS.

13. The coated article of claim 11, wherein the transmissive medium comprises a first plurality of bonded first ceramic particles.

14. The coated article of claim 11, wherein the transmissive medium comprises a first plurality of bonded first ceramic particles, and the plurality of radiation-scattering centers comprises a second plurality of voids.

15. The coated article of claim 11, wherein the transmissive medium comprises a first plurality of bonded first ceramic particles, and the plurality of radiation-scattering centers comprises a second plurality of second ceramic particles dispersed through the transmissive medium.

16. The coated article of claim 11, wherein the transmissive medium comprises
   a first set of ceramic particles having a first size range, and
   a second set of ceramic particles having a second size range different from the first size range.

17. The coated article of claim 16, wherein a second average size in the second size range is less than about 1/7 of a first average size in the first size range.

18. The coated article of claim 11, wherein the low-emissivity top coat is a ceramic multilayer optical reflector.

19. The coated article of claim 11, further including a thermal barrier coating system overlying and contacting the substrate, with the diffuse reflective barrier coating overlying and contacting the thermal barrier coating system.

20. The coated article of claim 19, wherein the thermal barrier coating system comprises
   a ceramic thermal barrier coating layer contacting the diffuse reflective barrier coating system, and
   a bond coat between the substrate and the ceramic thermal barrier coating layer.

* * * * *